(No Model.)
J. W. CLARK.
SEED PLANTER.
No. 324,458. Patented Aug. 18, 1885.
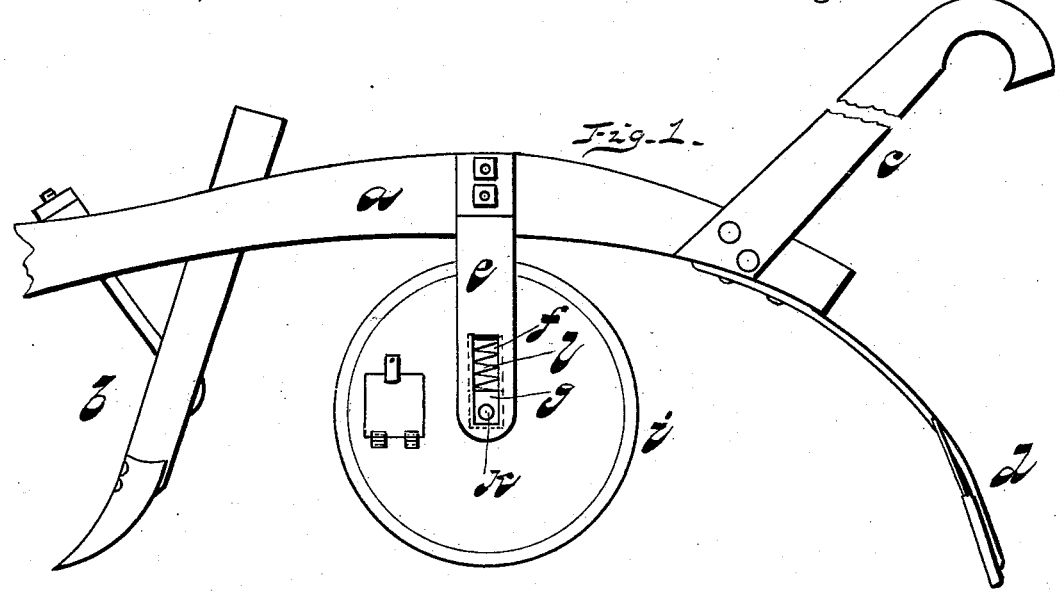
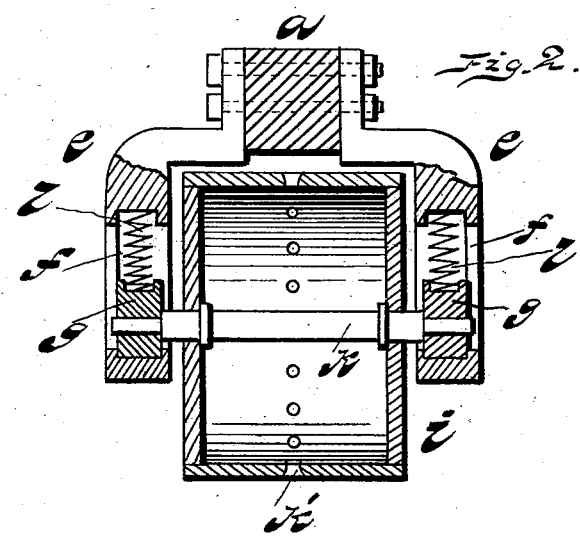
WITNESSES
Rutledge Beale
Frank Morgan
INVENTOR
J. W. Clark
By Wm. H. Bates and Co.
Attorneys.

UNITED STATES PATENT OFFICE.

JOHN W. CLARK, OF HERMANVILLE, MISSISSIPPI.

SEED-PLANTER.

SPECIFICATION forming part of Letters Patent No. 324,458, dated August 18, 1885.

Application filed June 1, 1885. (No model.)

*To all whom it may concern:*

Be it known that I, JOHN W. CLARK, a citizen of the United States, residing at Hermanville, in the county of Claiborne and State of Mississippi, have invented certain new and useful Improvements in Seed-Planters, of which the following is a specification, reference being had therein to the accompanying drawings.

My invention relates to improvements in corn and cotton-seed planters; and it consists in the construction and novel arrangements of devices, as will be hereinafter set forth.

The annexed drawings, to which reference is made, fully illustrate my invention, in which—

Figure 1 is a side view of my device, and Fig. 2 is a cross-sectional view of the same.

Referring by letter to the accompanying drawings, $a$ designates the plow-beam; $b$, the plow or furrow-opener; $c$, the handles, and $d$ the coverer.

$e$ $e$ represent two curved arms or standards, which are bolted at their upper ends to the beam, as shown, the lower ends of which are provided with the vertical slots $f$, in which is seated a bearing-block, $g$, having transverse perforations or bearings for the shaft $k$, which latter is secured to the cylinder $e'$, in which the seed is placed for planting. This cylinder is provided with perforations $k'$, through which the seed enters the furrow, and a suitable door, through which the seed is passed to within said cylinder.

Within the slots aforesaid is arranged a spring, $l$, which bears upon the journal-block at its lower end and permits the cylinder to accommodate itself to the unevenness of the ground.

It will be seen that the plow-point will open the furrow, the cylinder, being arranged in rear thereof, will drop the seed, and the coverer will throw the earth over the same.

Having described my invention, what I claim, and desire to secure by Letters Patent, is—

The herein-described seed-planter, consisting of the cylinder $e'$, having the perforations $k'$, and provided with the axle $k$, the angular arms $e$ $e$, having the slideway $f$, bearing-block $g$, and spring $l$, and secured to the beam $a$, having the coverer and furrow-opener, and handle $c$, the whole constructed and arranged to operate as described.

In testimony whereof I affix my signature in presence of two witnesses.

JOHN W. CLARK.

Witnesses:
 GEO. F. WOLFE,
 T. J. HARGROVE.